United States Patent [19]

Yamamoto

[11] Patent Number: 5,655,989
[45] Date of Patent: Aug. 12, 1997

[54] TOROIDAL TYPE CONTINUOUSLY VARIABLE TRANSMISSION

[75] Inventor: Takeshi Yamamoto, Yokohama, Japan

[73] Assignee: Nissan Motor Co., Ltd., Yokohama, Japan

[21] Appl. No.: 444,383

[22] Filed: May 18, 1995

[30] Foreign Application Priority Data

May 19, 1994 [JP] Japan .................................. 6-105575

[51] Int. Cl.⁶ ............................................ F16H 15/38
[52] U.S. Cl. ............................................ 476/40; 476/39
[58] Field of Search ................................. 476/40, 39

[56] References Cited

U.S. PATENT DOCUMENTS

| | | | |
|---|---|---|---|
| 2,020,677 | 11/1935 | Erban | 476/40 |
| 5,263,907 | 11/1993 | Fellows | 476/40 |

FOREIGN PATENT DOCUMENTS

| | | | |
|---|---|---|---|
| 140000 | 12/1934 | Germany | 476/40 |
| 3002034A1 | 7/1981 | Germany | 476/39 |
| 477808 | 3/1954 | Italy | 476/40 |
| 63-106456 | 5/1988 | Japan . | |

OTHER PUBLICATIONS

*1989 JSAE Spring Convention Proceedings* 1989-5, pp. 167–170, Published in 1989 by Society of Automotive Engineers of Japan.

*Primary Examiner*—Charles A. Marmor
*Assistant Examiner*—David M. Fenstermacher
*Attorney, Agent, or Firm*—Foley & Lardner

[57] ABSTRACT

A toroidal type continuously variable transmission has input and output conical disks having opposingly-curved conical faces, and a power roller tiltably positioned between and abutting the conical faces of the input and output disks. The power roller frictionally contacts the conical faces to transmit rotational movement between the input and output disks. The power roller is tiltable about a tilting axis that extends perpendicularly to a rotational axis of the power roller to provide a continuous variation of speed ratio between the input and output disks by tilting the power roller. The radius of the curvature of the conical face that defines the input-disk conical face is reduced in the lower speed region to increase the speed ratio between the input and output disks, compared with the main curvature radius in the higher speed region. The radius reduction increases the surface area (the contacting oval) of the conical face, providing a surface pressure reduction in the lower speed transmitting ratio region.

4 Claims, 10 Drawing Sheets

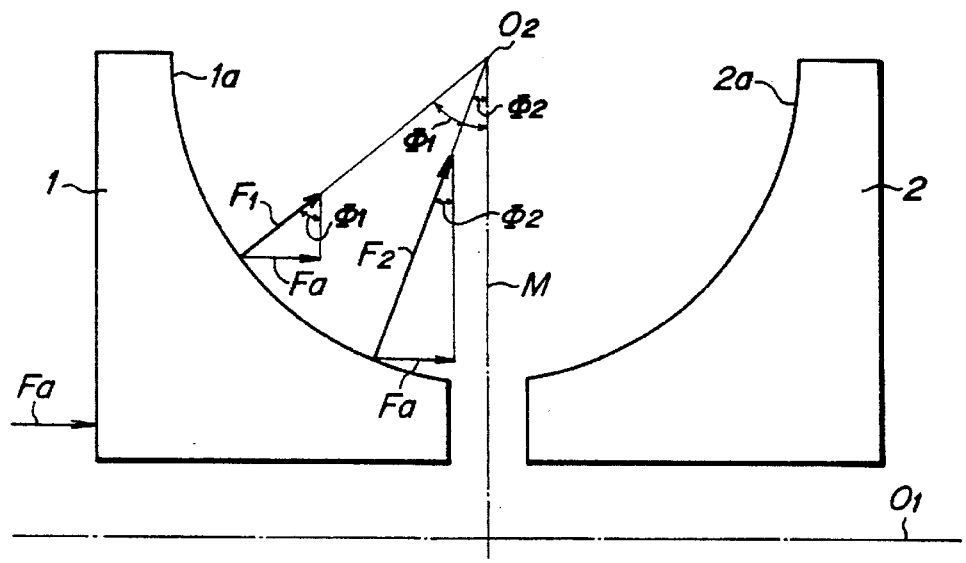
FIG_8
PRIOR ART
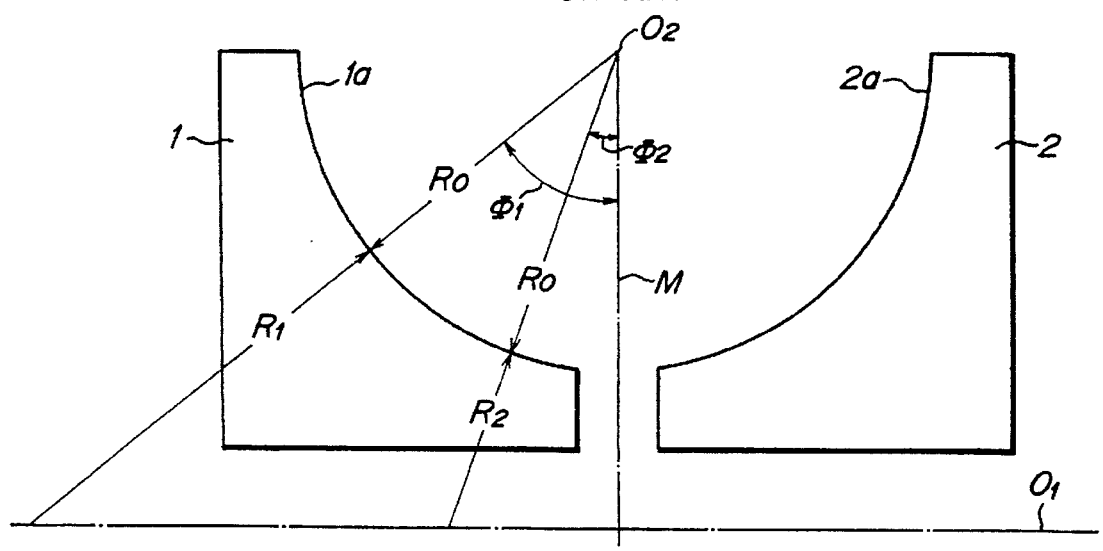
FIG_9
PRIOR ART

TOROIDAL TYPE CONTINUOUSLY VARIABLE TRANSMISSION

BACKGROUND OF THE INVENTION

1. Field of the Present Invention

The present invention relates generally to a toroidal type continuously variable transmission for e.g. an automotive vehicle. More particularly, the present invention relates to a technology for reducing surface pressure between a power roller and input and output conical disks of a toroidal type continuously variable transmission, and a technology for improving a transmitting efficiency between the power roller and the input and output conical disks.

2. Description of the Related Art

Previous toroidal type continuously variable transmissions generally have a constitution similar to that of a known toroidal type continuously variable transmission mentioned in "1989 JSAE Spring Convention Proceedings 1989-5", pages 167 to 170, published by Society of Automotive Engineers of Japan, in 1989.

FIG. 8 and FIG. 9 schematically show the configuration of the known toroidal type continuously variable transmission, wherein an input conical disk 1 and an output conical disk 2 are coaxially opposed to each other and arranged rotatably about a common axis $O_1$, and at least one power roller (not shown) is arranged between mutually opposing conical faces 1a, 2a of the input and output conical disks 1, 2. The power roller is frictionally contacted with the conical faces 1a, 2a respectively at a contacting point. Such a contacting point is an oval surface in a strict sense, so that the contacting point is called a contacting oval. The power roller is arranged rotatably about a rotational axis extending across the above-mentioned axis $O_1$, so that the power roller transmits rotational movement between the input and output conical disks 1, 2.

Further, as shown in FIGS. 8, 9, the power roller can be tilted about a tilting axis $O_2$ extending perpendicular to the rotational axis of the power roller, in a bisecting plane M positioning perpendicular to the axis $O_1$ between the conical disks 1, 2 (two examples of a tilting angle $\Phi$ of the power roller are shown by references $\Phi_1$, $\Phi_2$). By such tilting of the the power roller, each radius of tracing circles of the contacting point on the conical faces 1a, 2a can be continuously varied, so that a transmitting ratio between the input and output conical disks 1, 2 and hence a speed ratio between input and output speed of the toroidal type transmission can be continuously varied.

The known toroidal type continuously variable transmission is provided with a loading cam (not shown) for pinching the power roller between the input and output conical disks 1, 2 to enable the power roller to transmit the rotational movement. As shown in FIG. 8, the loading cam generates a thrust Fa corresponding to an input torque, which thrust Fa urges the input and output conical disks 1, 2 toward mutually closing directions, causing pressing forces exerted from the conical faces 1a, 2a to the power roller. The magnitude of the pressing forces for the power roller is varied as shown by references $F_1$, $F_2$ with regard to the conical face 1a, corresponding to change of degree of the power roller tilting angle e.g. from $\Phi_1$ to $\Phi_2$ even under constant magnitude of the thrust Fa, so that the pressing force for the power roller exerted from the conical face 1a is increased as the power roller tilting angle $\Phi$ is reduced. Thus, the pressing force for the power roller becomes large when the power roller tilting angle $\Phi$ enters into a small angle region causing lower speed transmitting ratios (higher value of the speed ratio between input and output speed of the toroidal type transmission to be available) corresponding to lower speeds such as e.g. 1st speed and 2nd speed of a conventional gear-type transmission, which small angle region is hereinafter called a lower speed transmitting ratio region. Incidentally, a large angle region of the power roller tilting angle $\Phi$ causing higher speed transmitting ratios corresponding to higher speeds such as e.g. 4th speed and 5th speed of a conventional gear-type transmission is hereinafter called a higher speed transmitting ratio region.

On the other hand, as shown in FIG. 9, in the known toroidal type continuously variable transmission, as the power roller tilting angle $\Phi$ is reduced e.g. from $\Phi_1$ to $\Phi_2$, a pressing direction distance from the contacting oval to the axis $O_1$ is reduced e.g. from $R_1$ to $R_2$, resulting a surface area reduction of the contacting oval, while a pressing direction distance from the contacting oval to the tilting axis $O_2$ is kept to a constant certain tilting radius $R_0$. Because, the pressing direction distance determined along a straight line normal to the tilting axis $O_2$ and passing through a center of the contacting oval and the tilting axis $O_2$, is related to a curvature radius in a section of the input conical disk, which section being positioned in a hypothetical plane including the center of the contacting oval and the tilting axis $O_2$ and extending across the rotational axis $O_1$ of the input conical disk 1, so that the curvature radius in the above-mentioned section of the input conical disk and hence the surface area of the contacting oval is reduced corresponding to the reduction of the pressing direction distance.

Therefore, with a reduction of the power roller tilting angle $\Phi$ e.g. from $\Phi_1$ to $\Phi_2$, Hertzian surface pressure on the contacting oval is inevitably increased due to the increase of the pressing force and the surface area reduction of the contacting oval, thus the surface pressure on the input conical disk 1 and the power roller tilting angle $\Phi$ have a relation as shown in FIG. 10. Based on this relation, the surface pressure on the input conical disk 1 becomes remarkably high in the lower speed transmitting ratio region. Accordingly, in the known toroidal type continuously variable transmission, so as to reduce the surface pressure on the input conical disk 1 to allowable surface pressure for a sufficient durability, a torque capacity of the continuously variable transmission becomes inevitably small in the lower speed transmitting ratio region. Further, because reduction of the curvature radius of the conical disks 1, 2 and the power roller is restricted due to the small torque capacity in the lower speed transmitting ratio region, the surface pressure on the input disk 1 in the higher speed transmitting ratio region becomes small as shown in FIG. 10, so that a technique providing a reduced surface area of the contacting oval cannot be employed for an enhancement of a transmitting efficiency between the power roller and the input and output conical disks.

Another toroidal type continuously variable transmission is proposed by Japanese Patent Application Laid-Open No. 106456/88. In this known continuously variable transmission, as shown in FIG. 11, a main curvature radius defining the conical face 1a of the input conical disk 1 is enlarged to β oversize (i.e. $R_0+\beta$) in a region of the conical face 1a wherein the conical face 1a is contacted with the power roller in the higher speed transmitting ratio region, compared with a main curvature radius $R_0$ in a residual region of the conical face 1a, while a main curvature radius defining the conical face 2a of the input conical disk 2 is enlarged to γ oversize (i.e. $R_0+\gamma$) in a region of the conical face 2a wherein the conical face 2a is contacted with the power roller in the lower speed transmitting ratio region, compared with a main curvature radius $R_0$ in a residual region of the conical face $2a$.

However, the known continuously variable transmission of the latter cannot solve the above-mentioned problem with reference to the surface pressure of the input conical disk in the lower speed transmitting ratio region that is severest for a durability of the input conical disk, because the known continuously variable transmission proposes neither technical means for reducing the pressing force $F_2$ for the power roller shown in FIG. 8 nor technical means for increasing the distance $R_2$ shown in FIG. 9. Further, the known continuously variable transmission of the latter cannot reduce surface pressure of the output conical disk 2 in the lower speed transmitting ratio region.

SUMMARY OF THE INVENTION

It is therefore an object of the present invention to provide an improved toroidal type continuously variable transmission capable of satisfying a surface pressure restriction requirement in the lower speed transmitting ratio region severest for a durability of the input conical disk, while reducing surface pressure on the output conical disk, thus realizing an improved durability, and an enhanced transmitting efficiency owing to a surplus of the surface pressure provided by the reduction of the surface pressure.

Briefly stated, the present invention provides a toroidal type continuously variable transmission comprising input and output conical disks coaxially opposed and rotatably arranged respectively, and at least one power roller arranged between mutually opposing conical faces of the input and output conical disks so as to be frictionally contacted with the conical faces to transmit rotational movement between the input and output conical disks, which power roller being capable of being tilted about a tilting axis extending perpendicular to a rotational axis of the power roller so as to vary each radius of tracing circles of a contacting point on the conical faces continuously to provide a continuous variation of a speed ratio between input and output speed of the toroidal type transmission.

In the toroidal type continuously variable transmission according to the present invention, a main curvature radius defining the conical face of the input conical disk is reduced in a region of the conical face where the conical face is contacted with the power roller with a tilting angle in the lower speed transmitting ratio region, compared with a main curvature radius in a residual region of the conical face of the input conical disk.

With the toroidal type continuously variable transmission according to the present invention, input rotational movement brought to the input conical disk is transmitted to the power roller frictionally contacting therewith, then the rotational movement of the power roller is transmitted to the output conical disk frictionally contacting therewith, thus output rotational movement being taken out from the output conical disk. When the power roller is tilted about the tilting axis extending perpendicular to the rotational axis of the power roller, each radius of tracing circles of a contacting point on the conical faces is varied continuously to provide a continuous variation of a speed ratio between the input and output conical disks and hence input and output speed of the toroidal type transmission.

Further, with the toroidal type continuously variable transmission according to the present invention, since a main curvature radius defining the conical face of the input conical disk is reduced in a region of the conical face where the conical face is contacted with the power roller with a tilting angle in the lower speed transmitting ratio region, compared with a main curvature radius in a residual region of the conical face of the input conical disk, a pressing direction distance from a contacting oval on the input conical disk contacting with the power roller to a rotational axis of the input conical disk is increased in the conical face region having a reduced main curvature radius, as a result of which surface pressure can be reduced in the conical face region of the input conical disk, providing an improvement of durability of the continuously variable transmission.

In a preferred embodiment according to the present invention, further a main curvature radius defining the conical face of the output conical disk is reduced in a region of the conical face where the conical face is contacted with the power roller with a tilting angle in the lower speed transmitting ratio region, compared with a main curvature radius in a residual region of the conical face of the output conical disk.

With this embodiment according to the present invention, surface pressure can be reduced in the conical face region of the output conical disk, providing a further improvement of durability of the continuously variable transmission.

In another preferred embodiment according to the present invention, further a curvature of a surface of the power roller for contacting with the input and output conical disks is increased within a range where surface pressure reduction provided by the reduction of a main curvature radius of the input conical disk in the region of the conical face corresponding to the lower speed transmitting ratio region is not canceled by the curvature increase of the power roller.

With this embodiment according to the present invention, a surplus of the surface pressure provided by the reduction of the surface pressure can be utilized for an enhancement of a transmitting efficiency between the power roller and the input and output conical disks, thus the transmitting efficiency can be maximized in a range where surface pressure of the input conical disk is remained below or equal to allowable surface pressure.

BRIEF DESCRIPTION OF THE DRAWING

The present invention will now be explained in further detail by referring to the preferred embodiments shown in the accompanying drawings, in which:

FIG. 8 shows a vector diagram for explaining surface pressure on the input conical disk in the known continuously variable transmission of the former.

FIG. 9 shows a varying state of the pressing direction distance from the contacting oval on the input conical disk with the power roller to the rotational axis of the input conical disk in the known continuously variable transmission of the former.

DESCRIPTION OF THE PREFERRED EMBODIMENT

Figure 1:
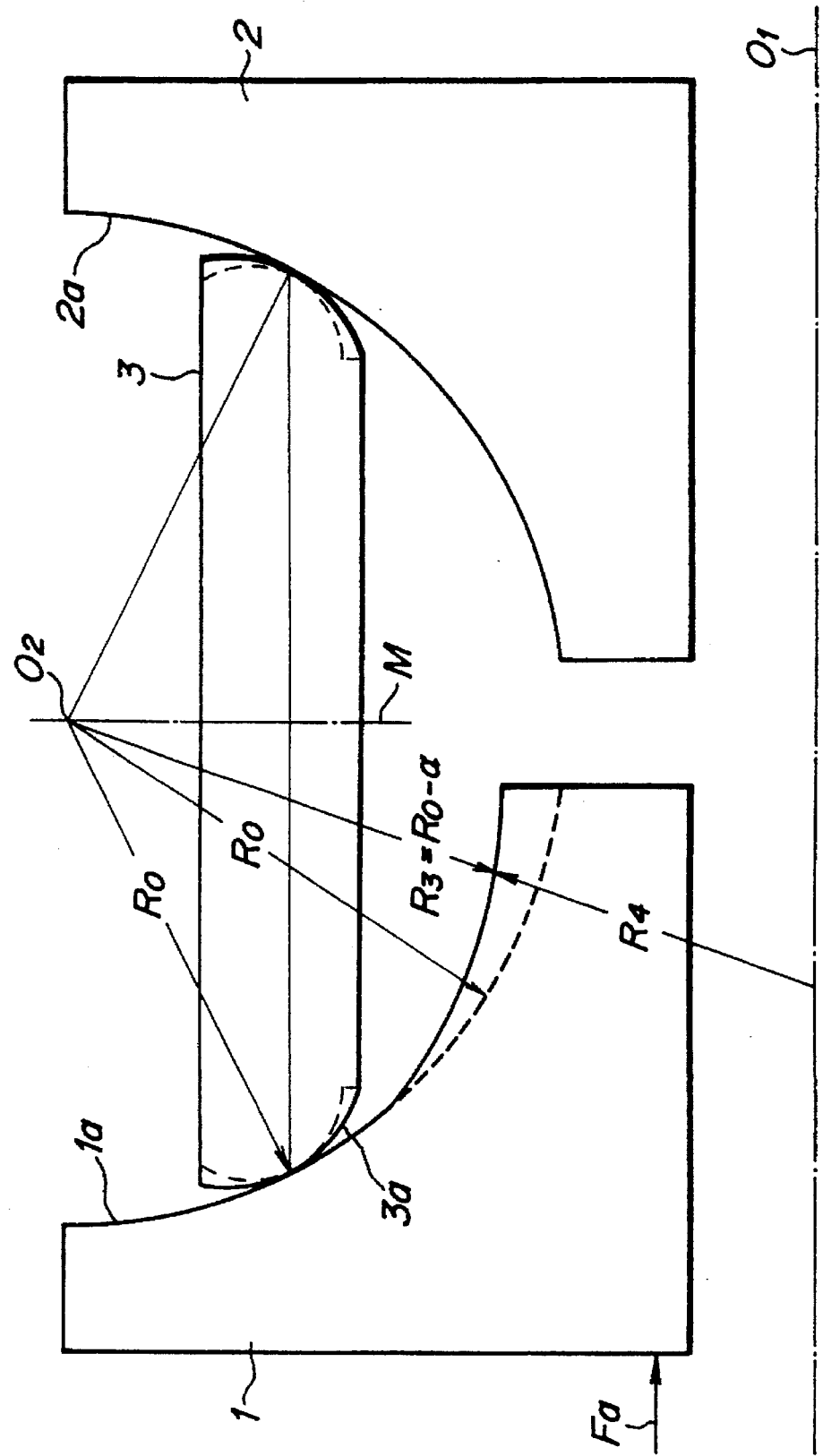
FIG. 1 shows a diagrammatic view of a characteristic part of a preferred embodiment of a toroidal type continuously variable transmission in accordance with the present invention.

Referring now to FIG. 1, there is shown a characteristic part of a preferred embodiment of a toroidal type continuously variable transmission in accordance with the present invention, wherein parts similar to that in FIG. 8 and FIG. 9 are referenced by the same numerals.

The toroidal type continuously variable transmission of the embodiment comprises an input conical disk 1 and an output conical disk 2 coaxially opposed to each other and arranged rotatably about a common rotational axis $O_1$ respectively. The continuously variable transmission of the embodiment further comprises a power roller 3 arranged between mutually opposing conical faces 1a, 2a of the input and output conical disks 1, 2 so as to be frictionally contacted with the conical faces to transmit rotational movement between the input and output conical disks. A surface of the power roller 3 for contacting with the input and output conical disks 1, 2 is referenced by numeral 3a. The power roller 3 is capable of being tilted about a tilting axis $O_2$ extending perpendicular to a rotational axis of the power roller 3 in a bisecting plane M positioning perpendicular to the axis $O_1$ between the conical disks 1, 2 so as to vary each radius of tracing circles of a contacting point on the conical faces 1a, 2a continuously to provide a continuous variation of a speed ratio between input and output speed of the toroidal type transmission. The continuously variable transmission in accordance with the present invention may comprise a plurality of power rollers 3 tilted synchronously.

The continuously variable transmission of the embodiment further comprises a loading cam (not shown) for pinching the power roller 3 between the input and output conical disks 1, 2 to enable the power roller 3 to transmit the rotational movement.

Particularly, in the continuously variable transmission of the embodiment, a main curvature radius $R_3$ defining the conical face 1a of the input conical disk 1 is reduced to α undersize (i.e. $R_3=R_0-α$) in a region of the conical face 1a where the conical face 1a is contacted with the power roller 3 with a tilting angle in the lower speed transmitting ratio region, compared with a main curvature radius $R_0$ in a residual region of the conical face 1a of the input conical disk 1, as a result of which a pressing direction distance $R_4$ from a contacting oval on the input conical disk 1 contacting with the power roller 3 to the rotational axis $O_1$ of the input conical disk 1 is increased to α oversize compared with that in the known continuously variable transmissions.

Actions of the continuously variable transmission of the embodiment is explained below. That is, in the case of the known toroidal type continuously variable transmission of the former, the power roller 3 and the output conical disk 2 are placed in the positions shown by broken lines in FIG. 2 due to the configuration of the conical face 1a of the input conical disk 1 when the tilting angle of the power roller 3 is in the lower speed transmitting ratio region. However, in the case of the continuously variable transmission of the embodiment, the power roller 3 and the output conical disk 2 are placed in the positions shown by solid lines in FIG. 2 owing to the special configuration of the conical face 1a of the input conical disk 1 even when the tilting angle of the power roller 3 is equal to that in the known toroidal type continuously variable transmission. A displacement of the tilting axis $O_2$ of the power roller 3 owing to an eccentric movement of the rotational axis of the power roller 3 permits the displacement of the power roller 3 and output conical disk 2 toward the positions shown by the solid lines.

Figure 2:
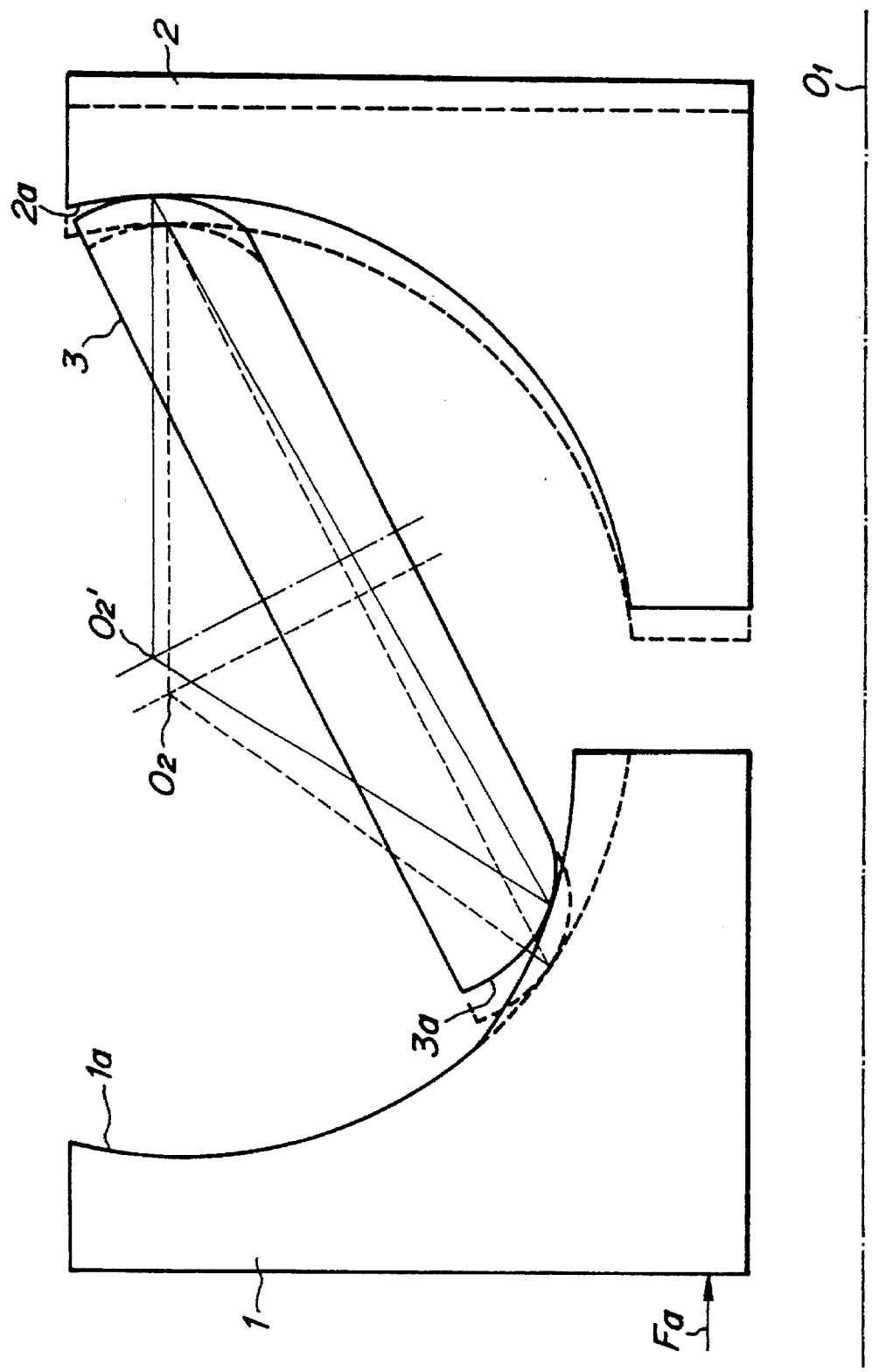
FIG. 2 shows the embodiment of the present invention in a state wherein a tilting angle of a power roller is in the lower speed transmitting ratio region.

With the continuously variable transmission of the embodiment, when the tilting angle of the power roller 3 is in the lower speed transmitting ratio region, a pressing direction distance $R_4$ from a contacting oval on the input conical disk 1 contacting with the power roller 3 to the rotational axis $O_1$ of the input conical disk 1 is increased compared with the pressing direction distance $R_2$ of the known continuously variable transmission shown in FIG. 2, so that a surface area of the contacting oval is increased owing to an increase of a curvature radius in a section of the input conical disk 1, which section being positioned in a hypothetical plane including the center of the contacting oval and the tilting axis $O_2$ and extending across the rotational axis $O_1$ of the input conical disk 1. As a result of this, a surface pressure on the input conical disk 1 in the embodiment according to the present invention can be reduced as shown by a solid line "a" in FIG. 3, compared with the surface pressure on the input conical disk 1 in the known continuously variable transmission of the former (mentioned in "1989 JSAE Spring Convention Proceedings 1989-5", pages 167 to 170) as shown by a broken line "b" and with the surface pressure on the input conical disk 1 in the known continuously variable transmission of the latter (proposed by Japanese Patent Application Laid-Open No. 106456/88) as shown by a chain line "c".

Figure 3:
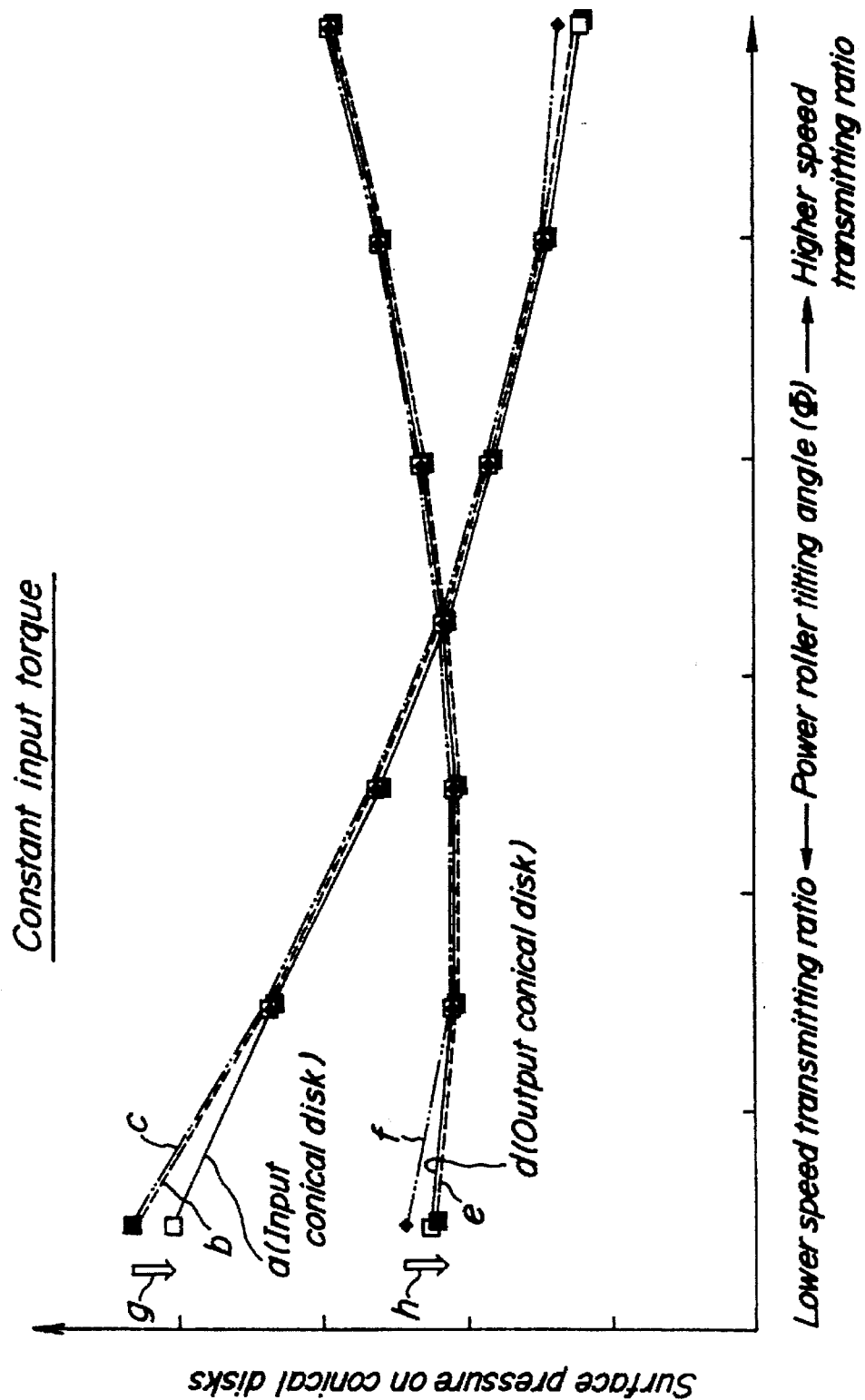
FIG. 3 shows surface pressure properties with reference to input and output conical disks in the embodiment of the present invention, comparing with that of the known continuously variable transmissions.

Further, a surface pressure on the output conical disk 2 in the embodiment according to the present invention can be reduced as shown by a solid line "d" in FIG. 3, compared with the surface pressure on the output conical disk 2 in the known continuously variable transmission of the latter (proposed by Japanese Patent Application Laid-Open No. 106456/88) as shown by a chain line "f", while the surface pressure on the output conical disk 2 in the embodiment is substantially equal to the surface pressure on the output conical disk 2 in the known continuously variable transmission of the former (mentioned in "1989 JSAE Spring Convention Proceedings 1989-5", pages 167 to 170) as shown by a broken line "e".

Figure 4:
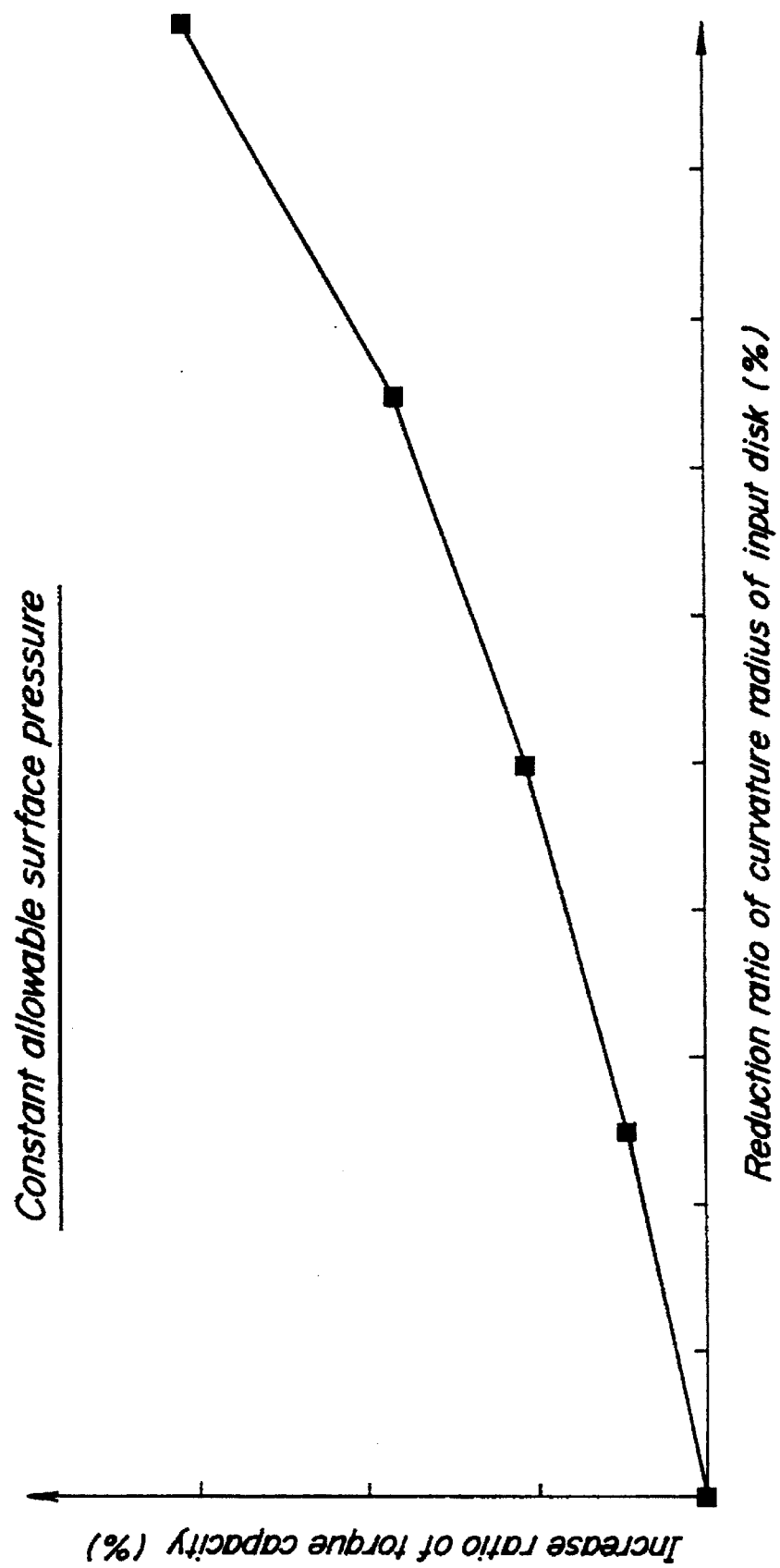
FIG. 4 shows a variation property of an increase ratio of a torque capacity achieved by the embodiment of the present invention.

Arrows "g", "h" in FIG. 3 show amounts of the surface pressure reductions of the input and output conical disks 1, 2 in the embodiment according to the present invention respectively. As shown in FIG. 3, each of the amount "g", "h" of the surface pressure reductions becomes large as a reduction ratio of the main curvature radius of the input conical disk 1 becomes large in the region of the conical face 1a where the conical face 1a is contacted with the power roller 3 with a tilting angle in the lower speed transmitting ratio region. Thus, as shown in FIG. 4, an increase ratio of a torque capacity of the continuously variable transmission becomes large as a reduction ratio of the main curvature radius of the input conical disk 1 becomes large in the region of the conical face 1a corresponding to the lower speed transmitting ratio region.

Figure 5:
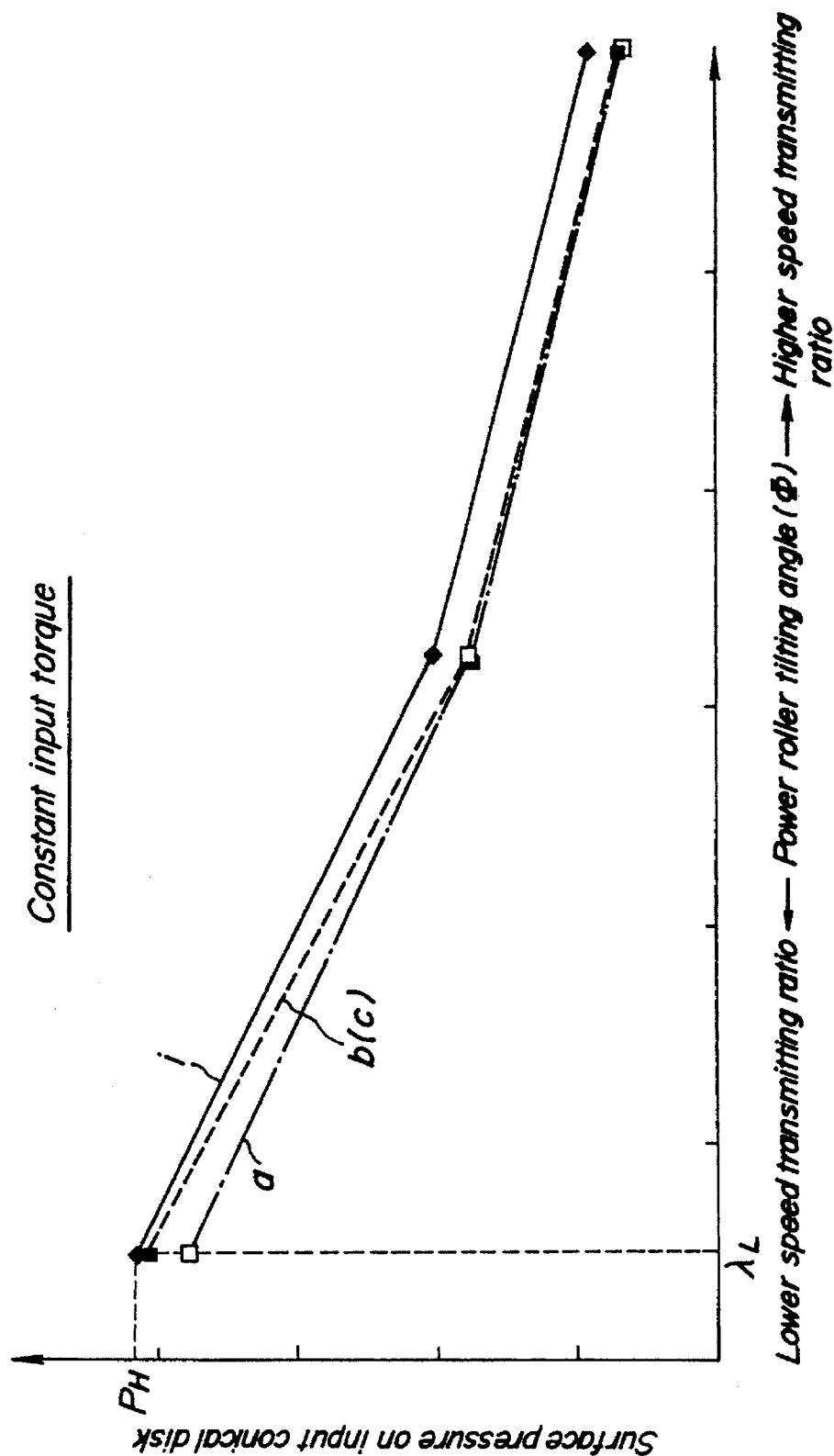
FIG. 5 shows a surface pressure property of an input conical disk in the embodiment of the present invention, in the case of utilizing a surplus of the surface pressure provided by reduction of the surface pressure, for an enhancement of a transmitting efficiency.

FIG. 5 shows the above-mentioned surface pressure reduction in the region of the power roller tilting angle Φ corresponding to the lower speed transmitting ratio region, with reference to only the input conical disk 1. It is also found from FIG. 5 that the surface pressure property of the input conical disk 1 is improved from "b", "c" in the known transmission to "a" in the embodiment of the present invention.

With reference to FIG. 5, if a curvature of the contacting surface 3a of the power roller 3 for contacting with the input and output conical disks 1, 2 is increased (i.e. the curvature radius of the contacting surface 3a is decreased), the surface pressure on the conical face 1a of the input conical disk 1 is increased in whole region of the power roller tilting angle Φ as shown by a solid line "i", while the surface area of the contacting oval is reduced, causing high transmitting efficiency, which is required especially in the higher speed transmitting ratio region. Therefore, in the case of when a level of an allowable surface pressure at the smallest power roller tilting angle $\lambda_L$ causing the lowest speed transmitting ratio (the highest value of the speed ratio to be available) is $P_H$, by maximizing the curvature of the contacting surface 3a of the power roller 3 within a range wherein the severest surface pressure on the conical face 1a at the smallest power roller tilting angle $\lambda_L$ is not beyond the allowable surface pressure $P_H$, a surplus of the surface pressure provided by the surface pressure reduction owing to the main curvature reduction in the lower speed transmitting ratio region can be utilize for an enhancement of the transmitting efficiency. Thus, with the embodiment according to the present invention, such a technique providing an enhanced transmitting efficiency in the higher speed transmitting ratio region can be employed, while ensuring a torque capacity in the lower speed transmitting ratio region.

Figure 6:
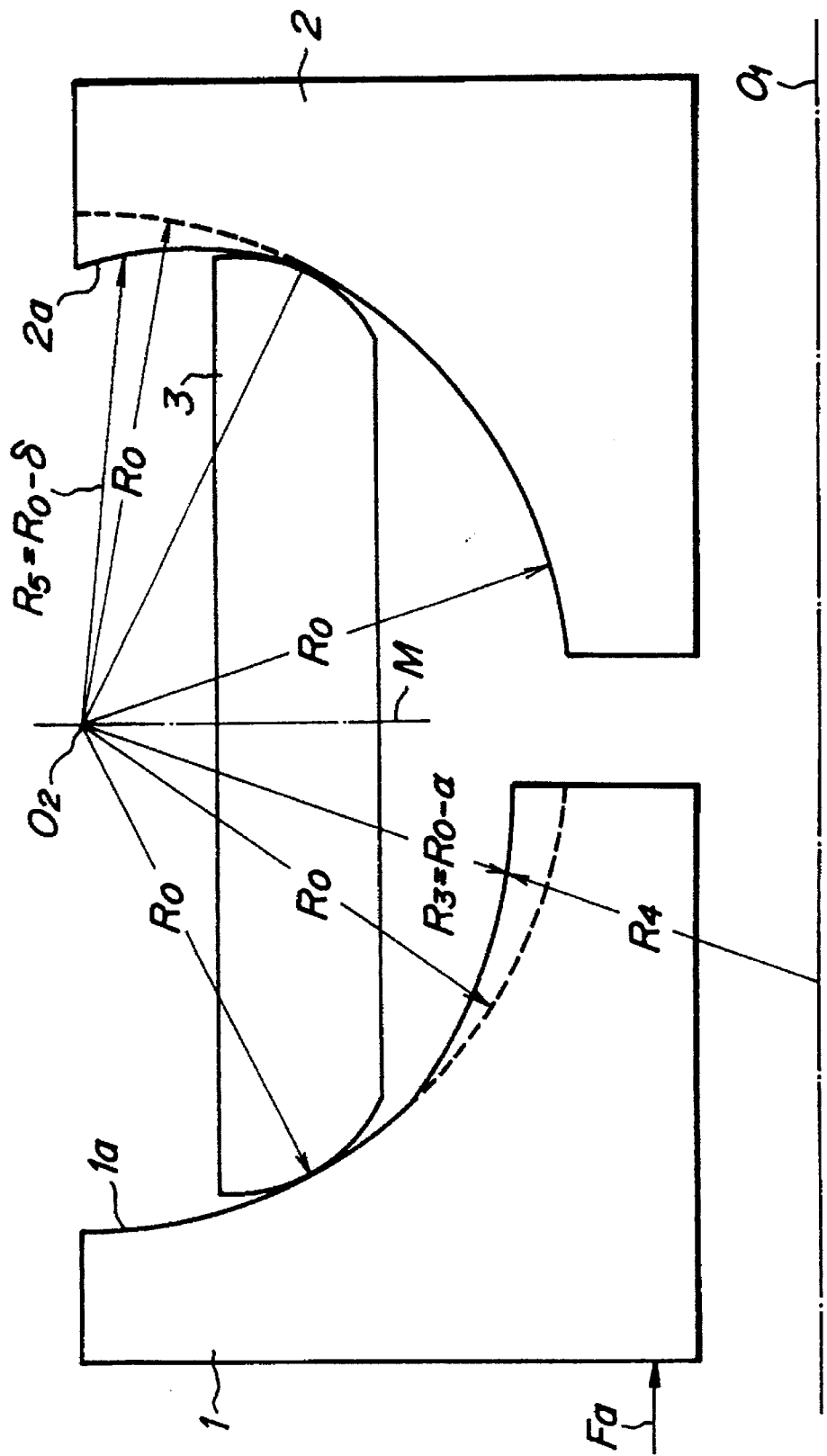
FIG. 6 shows, similarly to FIG. 1, a diagrammatic view of a characteristic part of another preferred embodiment of a toroidal type continuously variable transmission in accordance with the present invention.

FIG. 6 shows another preferred embodiment of a toroidal type continuously variable transmission in accordance with the present invention. The embodiment has a configuration similar to that of the former embodiment, except for that not only the input conical disk 1 but also the output conical disk 2 is adopted a measure for a surface pressure reduction. That is, a main curvature radius $R_S$ defining the conical face 2a of the output conical disk 2 is reduced to δ undersize (i.e. $R_S=R_0-\delta$) in a region of the conical face 2a where the conical face 2a is contacted with the power roller 3 with a tilting angle in the lower speed transmitting ratio region, compared with a main curvature radius $R_0$ in a residual region of the conical face 2a of the output conical disk 2.

Figure 7:
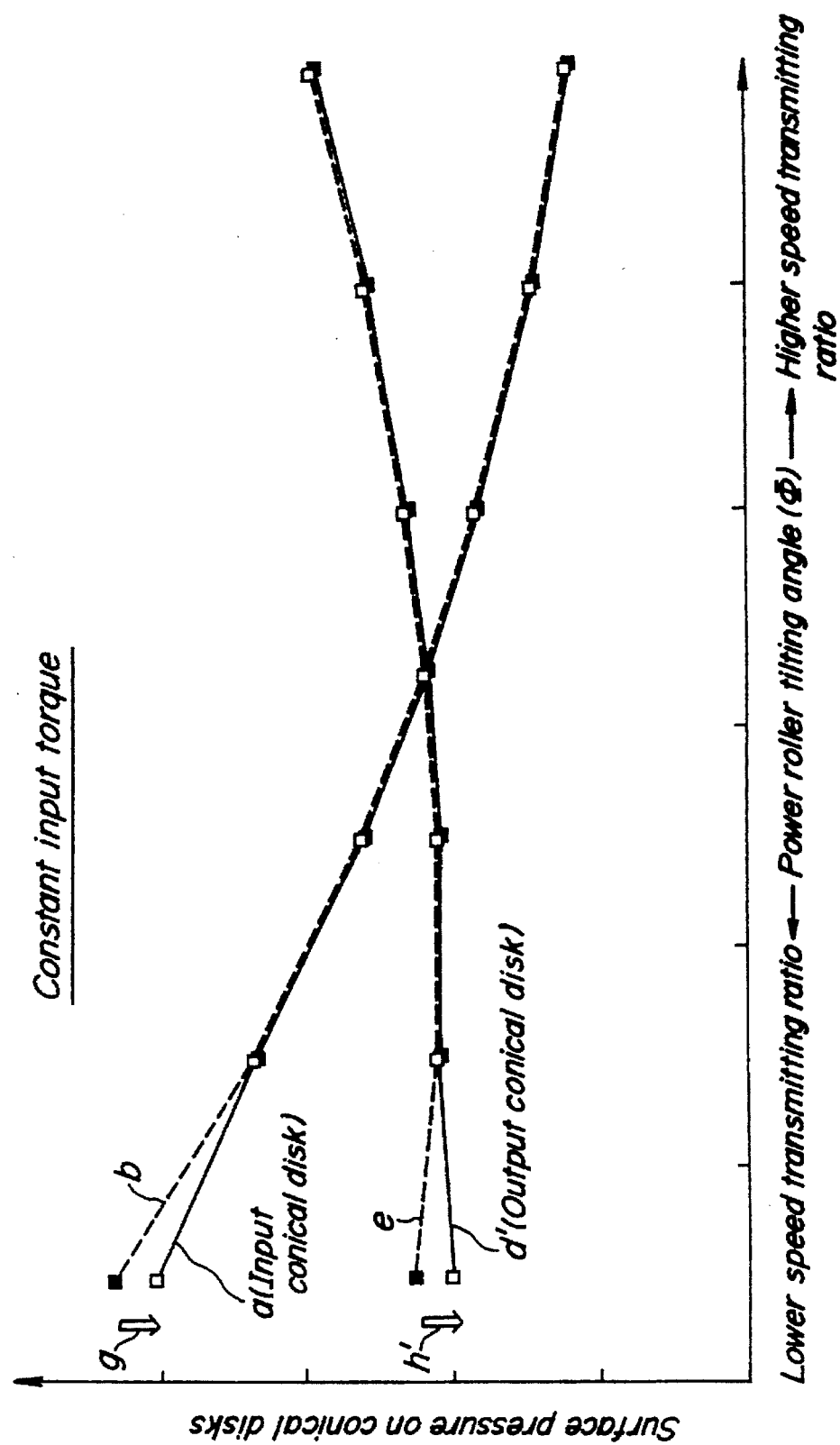
FIG. 7 shows, similarly to FIG. 3, surface pressure properties with reference to input and output conical disks in the latter embodiment of the present invention, comparing with that of the known continuously variable transmissions.
Figure 10:
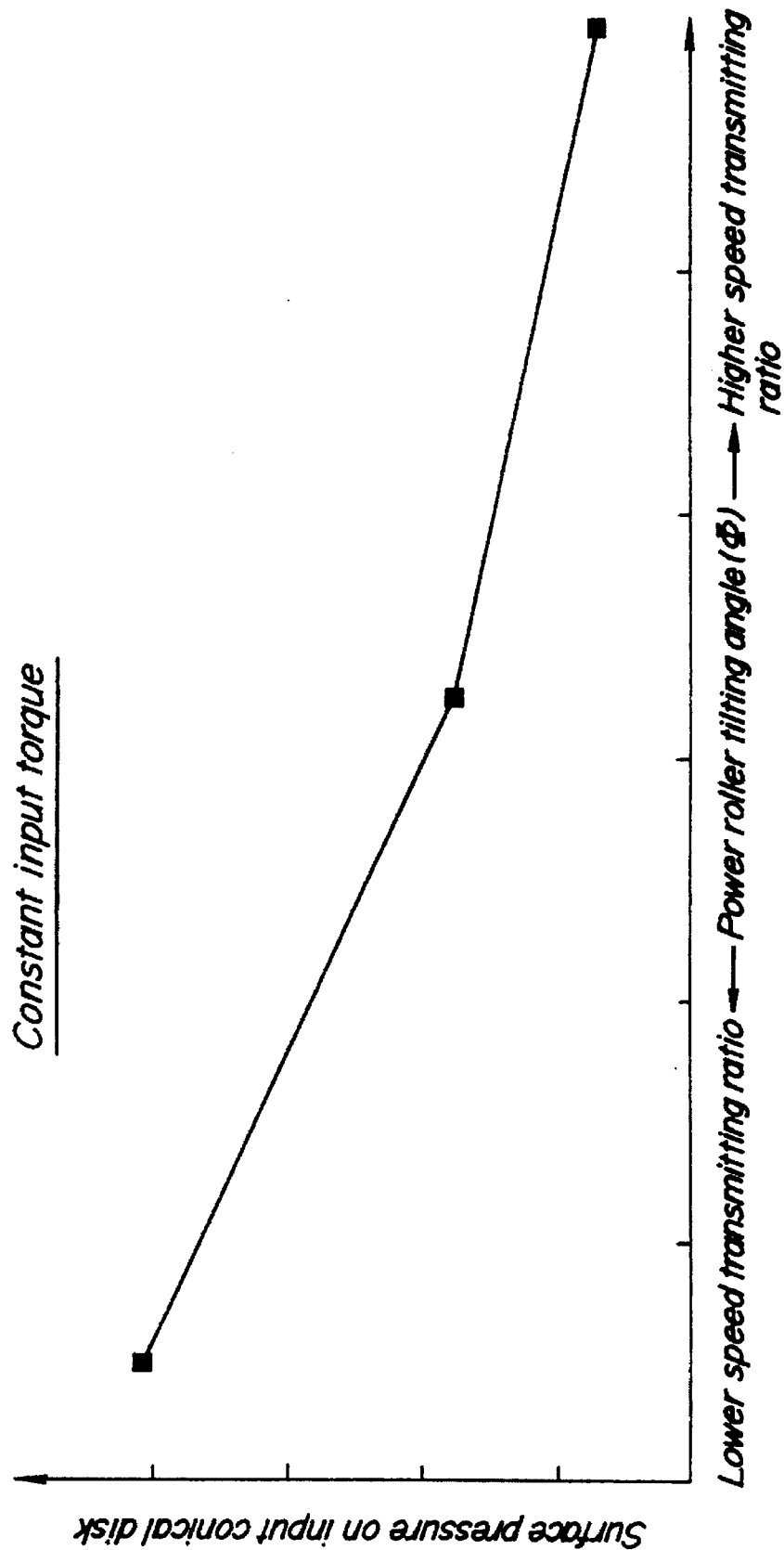
FIG. 10 shows a surface pressure property with reference to the input conical disk in the known continuously variable transmission of the former.
Figure 11:
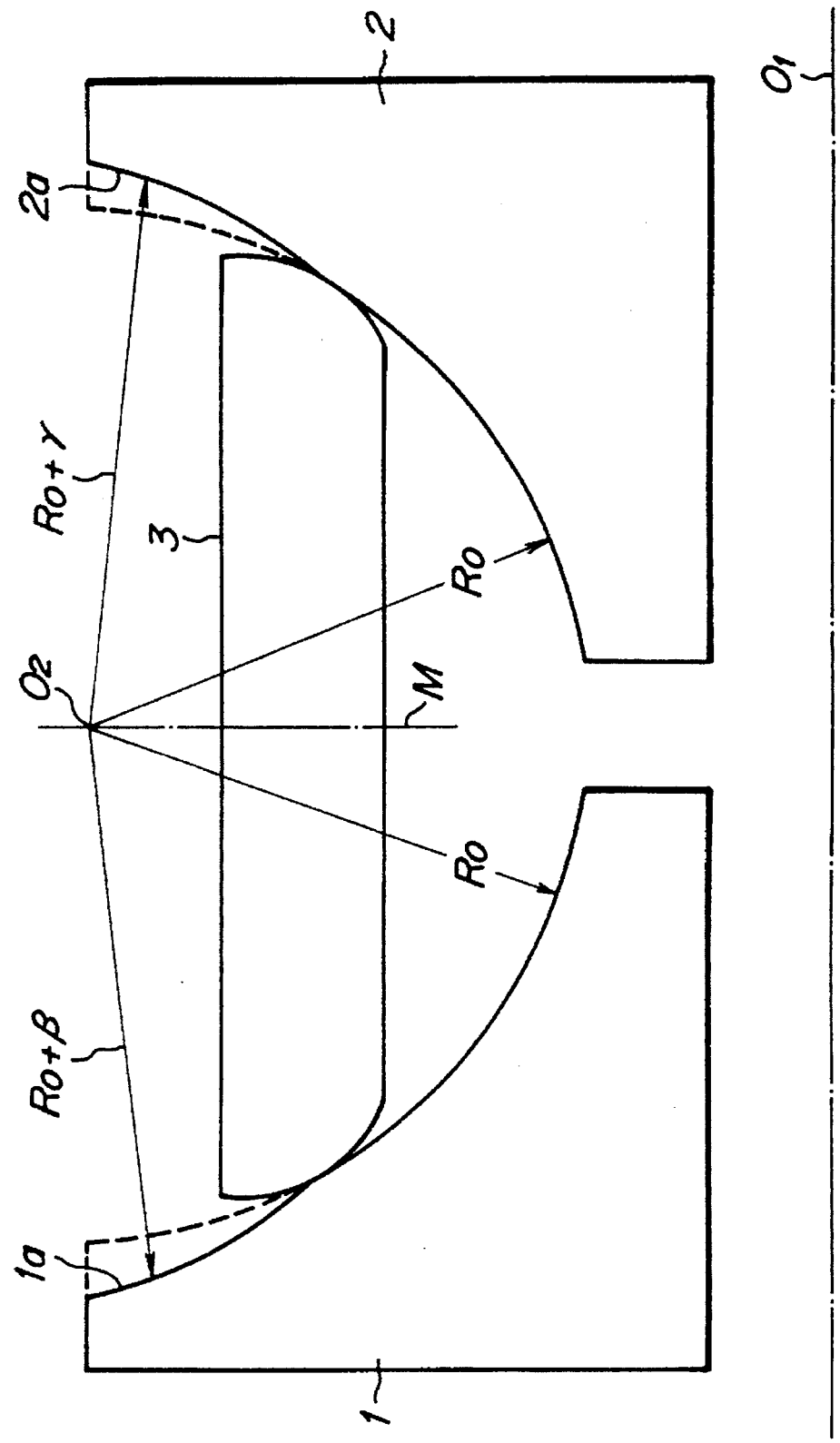
FIG. 11 shows a diagrammatic view of the known continuously variable transmission of the latter.

With the embodiment of the latter, as shown by a solid line "d'" in FIG. 7, a surface pressure on the conical face 2a of the output conical disk 2 can be reduced in the lower speed transmitting ratio region with a larger reduction amount "h'" than the reduction amount "h" of the surface pressure in the embodiment of the former shown by a broken line "e", the reason of the surface pressure property "d" in the embodiment of the former being shown by a broken line "e" is that the surface pressure property "d" in the embodiment of the former is substantially coincide with the surface pressure property "e" in the known transmission of the former as shown in FIG. 3.

The foregoing description is by way of example only, and not intended to limit the scope of the appended claims.

I claim:

1. A toroidal type continuously variable transmission comprising:

input and output conical disks coaxially opposed and rotatable relative to each other, said input and output conical disks having mutually opposing curved conical faces; and at least one power roller rotatable about a power-roller rotational axis and positioned between said mutually opposing conical faces of said input and output conical disks and frictionally contacting said conical faces to transmit rotational movement between said input and output conical disks, wherein said at least one power roller is tiltable about a tilting axis extending perpendicular to said power-roller rotational axis to vary each radius of tracing circles of a contacting point on said conical faces continuously to provide a continuously variable speed ratio between input and output disks, wherein said conical face of said input conical disk has a main curvature radius and a reduced curvature radius in a region of the conical face where said conical face contacts said power roller in a lower speed transmitting ratio region to increase the speed ratio between said input and output disks, compared with said main curvature radius of said conical face of said input conical disk.

2. A toroidal type continuously variable transmission as claimed in claim 1, wherein said conical face of said output disk has a main curvature radius and a reduced curvature radius in a region where said conical face contacts said power roller in a lower speed transmitting ratio region of said output disk, compared with said main curvature radius of said conical face of said output conical disk.

3. A toroidal type continuously variable transmission as claimed in claim 2, wherein a radius of curvature of a surface of said at least one power roller contacting said conical faces of said input and output conical disks is increased within a range where surface pressure reduction provided by said reduced curvature radius of said input disk corresponding to said lower speed transmitting ratio region of said input disk is not canceled by the curvature increase of said at least one power roller.

4. A toroidal type continuously variable transmission as claimed in claim 1, wherein a radius of curvature of a surface of said at least one power roller contacting said conical faces of said input and output conical disks is increased within a range where surface pressure reduction provided by said reduced curvature radius corresponding to said lower speed transmitting ratio region is not canceled by the curvature increase of said at least one power roller.

* * * * *